(12) United States Patent
Kikuchi et al.

(10) Patent No.: US 7,453,181 B2
(45) Date of Patent: Nov. 18, 2008

(54) PERMANENT MAGNET SYNCHRONOUS MOTOR AND COMPRESSOR USING THE SAME

(75) Inventors: Satoshi Kikuchi, Hitachi (JP); Haruo Koharagi, Hitachi (JP); Akeshi Takahashi, Hitachi (JP); Tomio Yoshikawa, Shizuoka (JP); Baiying Huang, Shizuoka (JP)

(73) Assignee: Hitachi Appliances, Inc., Tokyo (JP)

(*) Notice: Subject to any disclaimer, the term of this patent is extended or adjusted under 35 U.S.C. 154(b) by 0 days.

(21) Appl. No.: 11/646,382

(22) Filed: Dec. 28, 2006

(65) Prior Publication Data

US 2007/0145851 A1    Jun. 28, 2007

(30) Foreign Application Priority Data

Dec. 28, 2005  (JP) ............... 2005-376858

(51) Int. Cl.
*H02K 21/12*  (2006.01)

(52) U.S. Cl. ............... 310/156.78; 310/156.45

(58) Field of Classification Search ............ 310/156.78, 310/156.79, 156.81, 211, 156.45
See application file for complete search history.

(56) References Cited

U.S. PATENT DOCUMENTS

| 4,629,920 A | * | 12/1986 | Hermann | ............... 310/156.35 |
| 6,525,442 B2 | * | 2/2003 | Koharagi et al. | ....... 310/156.48 |

FOREIGN PATENT DOCUMENTS

| JP | 2002-369422 | 12/2002 |
| JP | 2005-117771 | 4/2005 |

* cited by examiner

*Primary Examiner*—Dang D Le
(74) *Attorney, Agent, or Firm*—Antonelli, Terry, Stout & Kraus, LLP.

(57) ABSTRACT

A permanent magnet synchronous motor includes a rotor having cage windings and permanent magnets placed on an inner peripheral side of these cage winding bars, where the permanent magnets are placed and polarized so that a ratio $\theta/\alpha$ between a circumferential pitch angle $\theta$ of magnetic flux distribution of the permanent magnets and a magnet pole pitch angle $\alpha$ is between 0.67 and 0.91.

20 Claims, 7 Drawing Sheets

FIG. 12

PERMANENT MAGNET SYNCHRONOUS MOTOR AND COMPRESSOR USING THE SAME

BACKGROUND OF THE INVENTION

The present invention relates to a permanent magnet synchronous motor and a compressor and a rotor using the same.

An advantage of an induction motor is that, because it has a sturdy structure and is capable of line starting with a commercial power supply, it can be configured at low cost as a driving source of a machine of a constant speed drive which does not require speed control.

A synchronous motor can configure a drive portion at low cost as with the induction motor, and besides, there is almost no secondary copper loss in steady operation so that it has a merit of greatly contributing to improvement in efficiency of a drive system as compared with the induction motor. As its drawback, however, it has a cage winding for starting on a peripheral side of the rotor and it is necessary to further place permanent magnets on an inner peripheral side of this cage conductor so that the space for a layout of magnets is limited. Consequently, there are problems in terms of design, such as increase in leakage fluxes between magnetic poles and difficulty in rendering an induced electromotive force waveform as a sine wave.

As for a method of deciding the layout of permanent magnets to be embedded in the rotor, there are the techniques disclosed in JP-A-2005-117771, JP-A-2002-369422 and the like. They aim at optimization of the number of magnetic poles and structure of the synchronous motor for applications as systems such as a compressor and an electric vehicle respectively.

In the case of designing a self-starting permanent magnet synchronous motor for the compressor with the conventional techniques, there is concern that an excessive magnet amount may increase iron loss and input currents due to field weakening in steady operation and braking torque which blocks starting torque necessary for self-starting while an insufficient magnet amount may cause shortage of induced electromotive force for generating a desired output. In the latter case, it often leads to characteristic degradation such as increase in currents and reduction in power factor in conjunction with occurrence of magnetization.

An object of the present invention is to provide a permanent magnet synchronous motor with a rotor structure capable of improving motor efficiency without increasing iron loss and input currents in steady operation and braking torque on starting, a rotor thereof and a compressor using the same.

SUMMARY OF THE INVENTION

An aspect of the present invention is a permanent magnet synchronous motor which is configured so that a ratio $\theta/\alpha$ between a circumferential pitch angle $\theta$ and a magnet pole pitch angle $\alpha$ of the permanent magnets embedded on an inner peripheral side of a cage winding provided on a rotor becomes a value between 0.67 and 0.91.

Another aspect of the present invention is a permanent magnet synchronous motor of which permanent magnets are polarized so that the ratio $\theta/\alpha$ between a circumferential pitch angle $\theta$ and a magnet pole pitch angle $\alpha$ of magnetic flux distribution of the permanent magnets embedded on an inner peripheral side of a cage winding provided on a rotor becomes a value between 0.67 and 0.91.

According to the present invention, it is possible to provide a permanent magnet synchronous motor with a rotor structure capable of improving motor efficiency without increasing iron loss and input currents in steady operation and braking torque on starting.

Other objects, features and advantages of the invention will become apparent from the following description of the embodiments of the invention taken in conjunction with the accompanying drawings.

DESCRIPTION OF THE EMBODIMENTS

Hereinafter, an embodiment of the present invention will be described with reference to the drawings.

Figure 1:
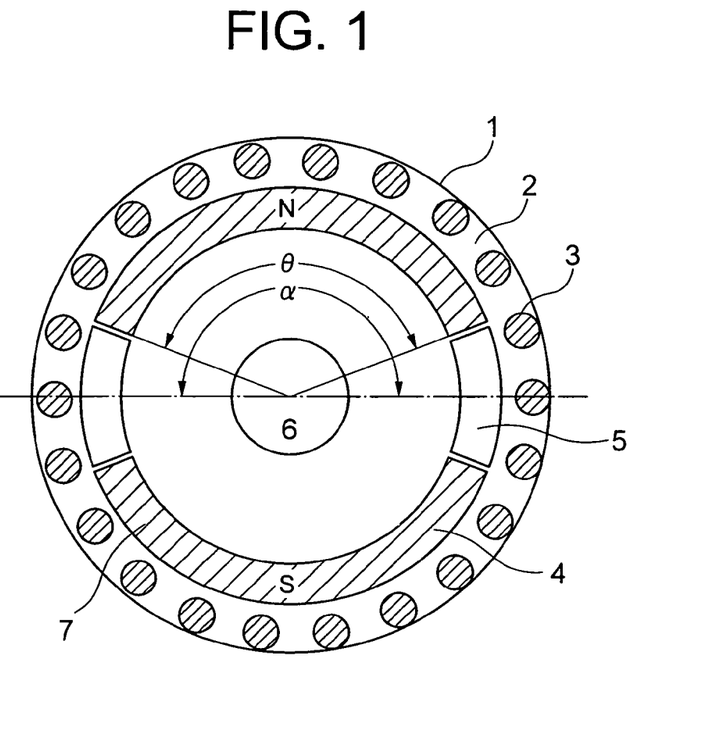
FIG. 1 is a radial sectional view of a rotor of a synchronous motor according to a first embodiment of the present invention.

FIG. 1 is a radial sectional view of a rotor of a synchronous motor according to a first embodiment of the present invention. In FIG. 1, a rotor 1 is configured by placing a large number of cage windings. for starting 3 and permanent magnets 4 mainly composed of rare earths and embedded in a magnet insertion hole 7 to have two magnetic poles inside a rotor core 2 provided on a shaft 6. There are empty holes 5 made between the magnetic poles to prevent a leakage flux generated between the magnetic poles.

A width opening $\theta$ of the permanent magnets 4 to a magnet pole pitch angle $\alpha$ is made to be $0.67 < \theta/\alpha < 0.91$.

Figure 2:
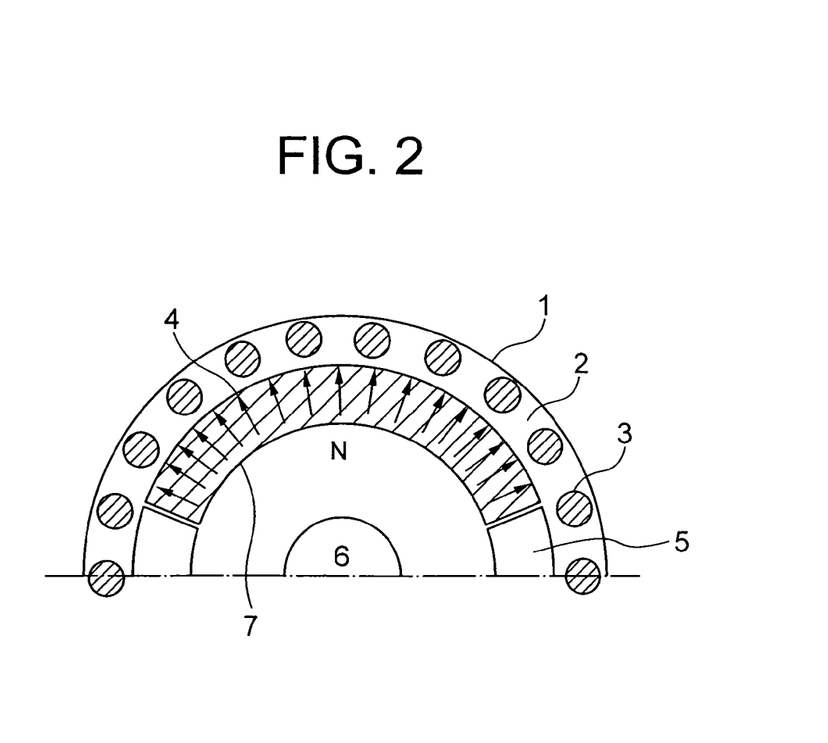
FIG. 2 is a conceptual diagram of an upper half of FIG. 1 to which a polarized state of a magnet is added.

FIG. 2 is a conceptual diagram of an upper half which has a polarized state of the permanent magnet 4 shown in FIG. 1 added thereto. As indicated by arrows in FIG. 2, a polarizing direction of the permanent magnet 4 is a diametric direction (radial direction) of the rotor 1.

The width opening of the permanent magnet 4 and a circumferential pitch angle of magnetic flux distribution of the permanent magnet 4 may be different depending on polarization thereof. In this embodiment, however, the circumferential pitch angle of the magnetic flux distribution of the permanent magnet 4 is equal to the width opening of the permanent magnet 4.

Figure 3:
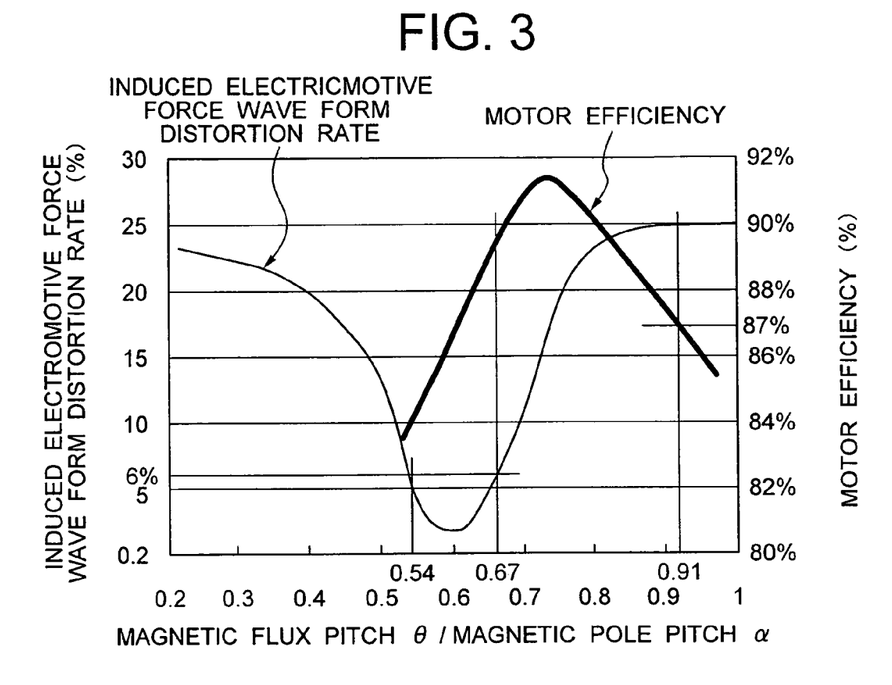
FIG. 3 is a graph showing actual data on an induced electromotive force waveform distortion.

FIG. 3 is a graph showing actual data on an induced electromotive force waveform distortion rate and motor efficiency. An abscissa axis thereof indicates a ratio $\theta/\alpha$ between a magnetic flux pitch angle $\theta$ and a magnet pole pitch angle $\alpha$ while an ordinate axis thereof indicates the induced electromotive force waveform distortion rate (%) and the motor efficiency (%) respectively.

According to Japanese Industrial Standards JIS-C4212, the efficiency of a high-efficiency low-voltage three-phase cage induction motor should satisfy 87.0% or more under the condition of coolant temperature of 40° C. or less in the case of operating the one of a totally-enclosed type, 3.7-kW output, two poles, 200 V and 50 Hz for instance. For this reason, it can be said that, if the efficiency of a permanent magnet synchronous motor is 87.0% or more, it is a good characteristic in comparison with the induction motor of a similar size in the case where it is driven in a compressor which is an environment of the coolant temperature of 100° C. or more.

In FIG. 3, it is the range capable of securing the efficiency of 87.0% or more that the ratio $\theta/\alpha$ between the width opening $\theta$ and the magnet pole pitch a is between 0.62 and 0.91. It has found, however, that there is a peak in the range where the ratio $\theta/\alpha$ exceeds 0.67, and the best characteristic is when the ratio $\theta/\alpha$ is 0.72. Therefore, it can be said that it is desirable to set the ratio $\theta/\alpha$ between 0.67 and 0.91 as a motor characteristic.

The reason for this is as follows. If the circumferential pitch angle $\theta$ of the permanent magnets is too large, magnetic fluxes of the permanent magnets increase and iron loss generated on a stator increases. As induced electromotive force increases against an applied voltage to be a field-weakening drive, input currents increase. If the circumferential pitch angle $\theta$ of the permanent magnets is extremely small, an amount of magnetic fluxes of the permanent magnets decreases and the induced electromotive force becomes minimal against the applied voltage to cause a magnetizing action so that the input currents increase again.

According to JP-A-2005-117771, it is possible to minimize the induced electromotive force waveform distortion rate by setting the ratio $\theta/\alpha$ between 0.54 and 0.67. However, it was verified to be inadequate from the viewpoint of the motor efficiency in the case where the ratio $\theta/\alpha$ is 0.62 or less.

It is suitable, based on this result, to have a configuration wherein the circumferential pitch angle of the permanent magnets 4 or the circumferential pitch angle $\theta$ of the magnetic flux distribution made by the permanent magnets 4 is between 0.67 and 0.91 of the magnet pole pitch angle $\alpha$.

Figure 4:
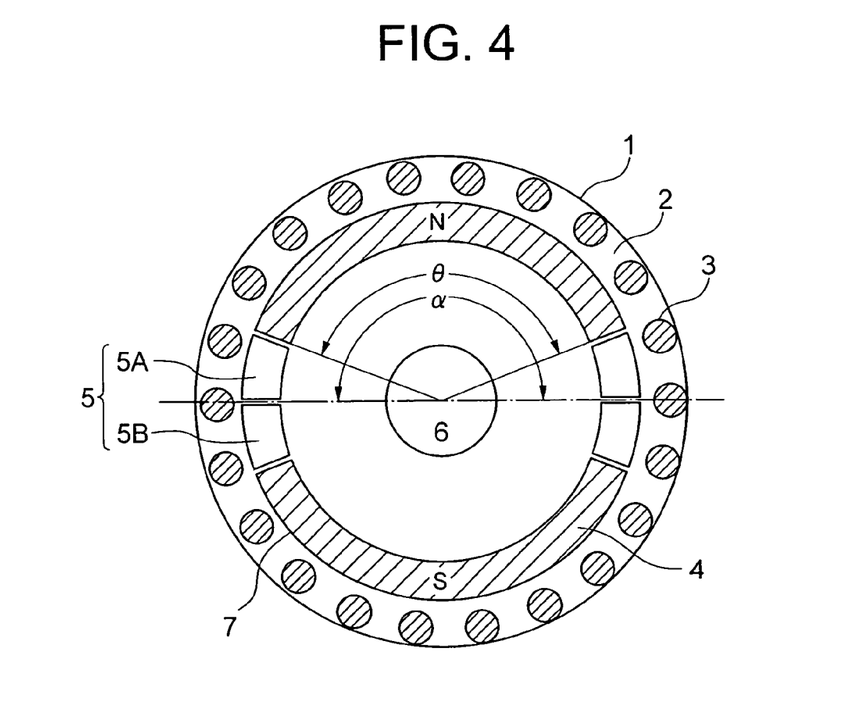
FIG. 4 is a radial sectional view of the rotor of the synchronous motor according to a second embodiment of the present invention.

FIG. 4 is a radial sectional view of the rotor of the synchronous motor according to a second embodiment of the present invention. In FIG. 4, the same components as those in FIG. 1 are given the same reference numbers and overlapping description thereof will be omitted. A difference from FIG. 1 is that the holes 5 provided between the magnetic poles are divided in two to be composed of 5A and 5B.

It is possible, by having such a configuration, to have the same effect as in FIG. 1 and reduce passages of the leakage fluxes so as to enhance the rotor strength.

Figure 5:
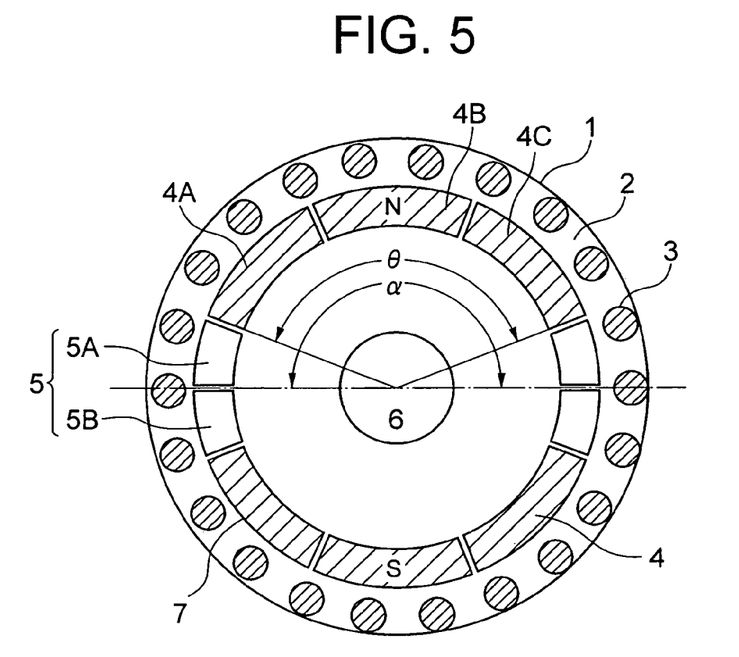
FIG. 5 is a radial sectional view of the rotor of the synchronous motor according to a third embodiment of the present invention.

FIG. 5 is a radial sectional view of the rotor of the synchronous motor according to a third embodiment of the present invention. In FIG. 5, the same components as those in FIG. 4 are given the same reference numbers and overlapping description thereof will be omitted. A difference from FIG. 4 is that the permanent magnet 4 is placed by dividing it into multiple segments such as 4A, 4B and 4C. If thus configured, the rotor strength can be further enhanced than in the case of FIG. 4. In FIG. 5, the permanent magnet 4 is divided into three. However, it goes without saying that the same effect can be obtained when it is divided into even more segments.

Figure 6:
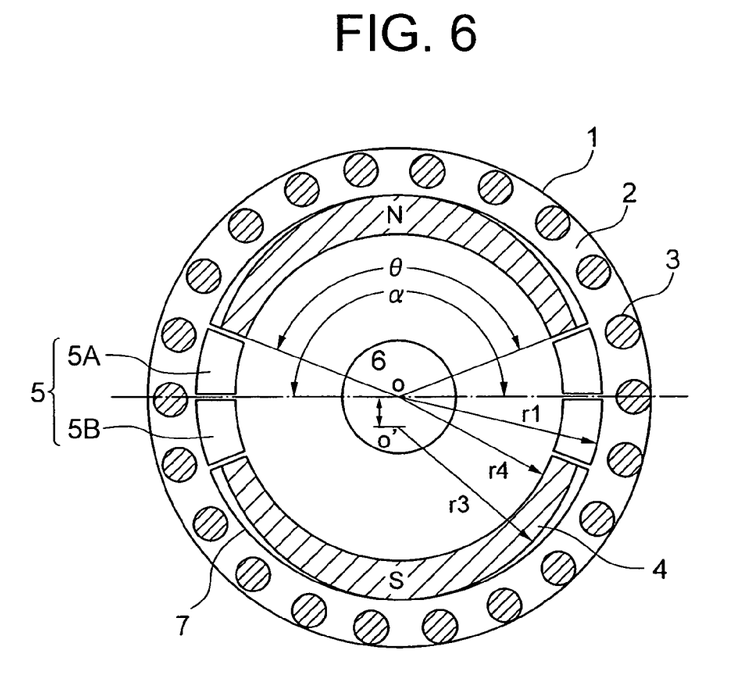
FIG. 6 is a radial sectional view of the rotor of the synchronous motor according to a fourth embodiment of the present invention.

FIG. 6 is a radial sectional view of the rotor of the synchronous motor according to a fourth embodiment of the present invention. In FIG. 6, the same components as those in FIG. 4 are given the same reference numbers and overlapping description thereof will be omitted. A difference from FIG. 4 is that a radius of an arc (hereinafter, referred to merely an outside diameter) r3 forming a periphery of the permanent magnet 4 is shorter than an outside diameter r1 of the magnet insertion hole 7 and non-concentric. To be more specific, the outside diameter r1 of the magnet insertion hole 7 is the arc of a radius r1 of which center is an origin O of the shaft 6. In comparison, the outside diameter r3 of the permanent magnet 4 is the arc of the radius r3 of which center is a point O1 deviated from the origin O just by a distance 1. Here, an inside diameter of the permanent magnet 4 is equal to an inside diameter r4 of the magnet insertion hole 7.

As in this embodiment, use of an eccentric magnet extends a gap length of a circumferential end of the magnet, and so an interlinkage of the magnetic flux with a stator winding around the end can be alleviated to be closer to a sine wave. Therefore, it is possible, according to this embodiment, to have the same effect as in FIG. 4 and render the magnetic flux distribution closer to the sine wave.

Figure 7:
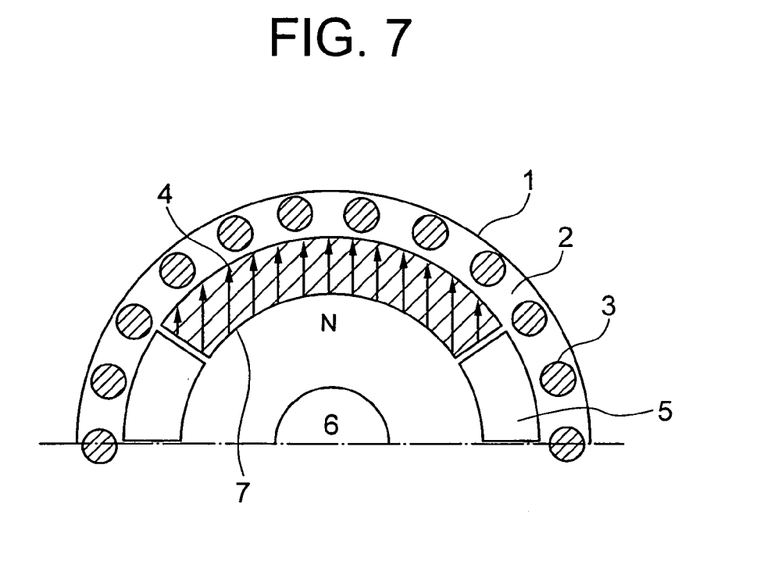
FIG. 7 is a conceptual diagram of an upper half of the rotor of the synchronous motor according to a fifth embodiment of the present invention to which a polarized state of a magnet is added.

FIG. 7 is a radial upper half sectional view showing the polarized state of the magnet of the rotor according to a fifth embodiment of the present invention. In FIG. 7, the same components as those of the embodiments in FIGS. 1 to 5 are given the same reference numbers and overlapping description thereof will be omitted. As indicated by the arrows in FIG. 7, the magnet orientation of the permanent magnet 4 is parallel orientation. It is possible, even in the case of such orientation, to obtain almost the same characteristics as those of the embodiments in FIGS. 1 to 5.

Figure 8:
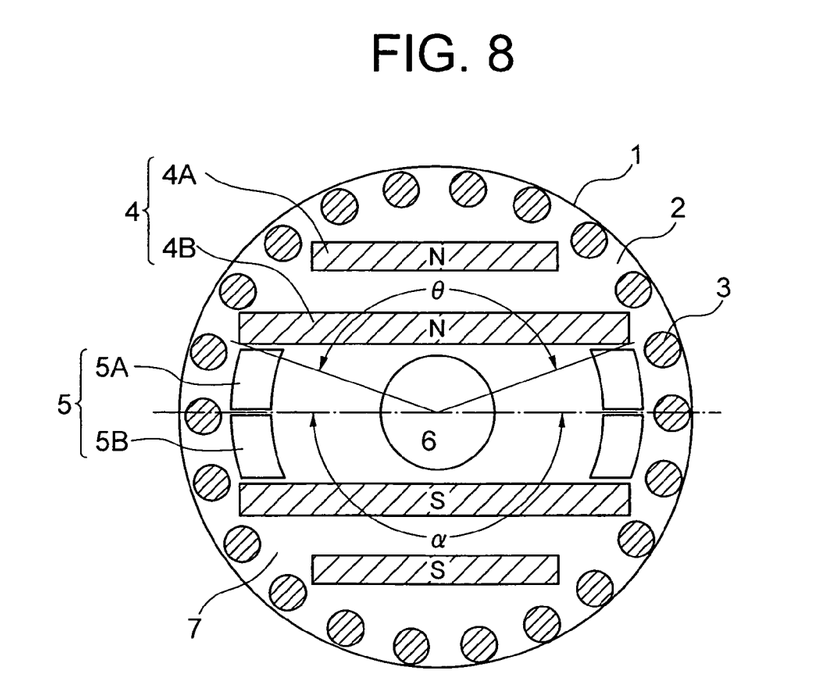
FIG. 8 is a radial sectional view of the rotor of the synchronous motor according to a sixth embodiment of the present invention.

FIG. 8 is a radial sectional view of the rotor of the synchronous motor according to a sixth embodiment of the present invention. In FIG. 8, the same components as those in FIG. 4 are given the same reference numbers and overlapping description thereof will be omitted. A difference from FIG. 4 is that the permanent magnets 4 are composed of flat plates, where one magnetic pole is configured by stacking two flat plates 4A and 4B. Even if thus configured, it is possible to obtain the same characteristic as that of the embodiment in FIG. 4.

Figure 9:
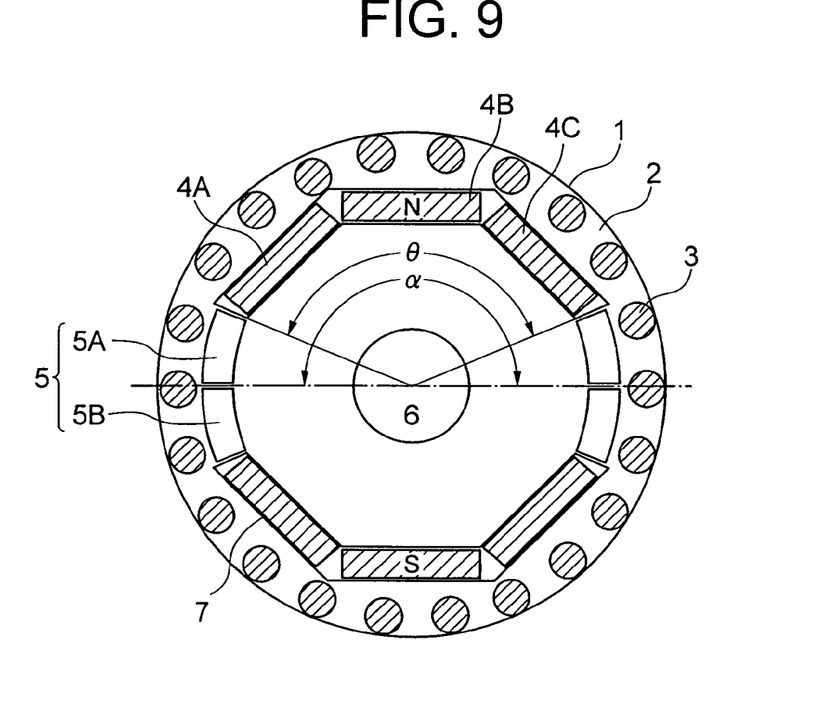
FIG. 9 is a radial sectional view of the rotor of the synchronous motor according to a seventh embodiment of the present invention.

FIG. 9 is a radial sectional view of the rotor of the synchronous motor according to a seventh embodiment of the present invention. In FIG. 9, the same components as those in FIG. 7 are given the same reference numbers and overlapping description thereof will be omitted. A difference from FIG. 7 is that one magnetic pole is configured by placing three permanent magnets 4A, 4B and 4C with an equal pitch in a circumferential direction. Even if thus configured, it is possible to obtain the same characteristic as that of the embodiment shown in FIG. 7. In FIG. 9, the permanent magnet 4 is divided into three segments. However, it goes without saying that the same effect can be obtained when it is one segment or divided into two segments or even more segments.

Figure 10:
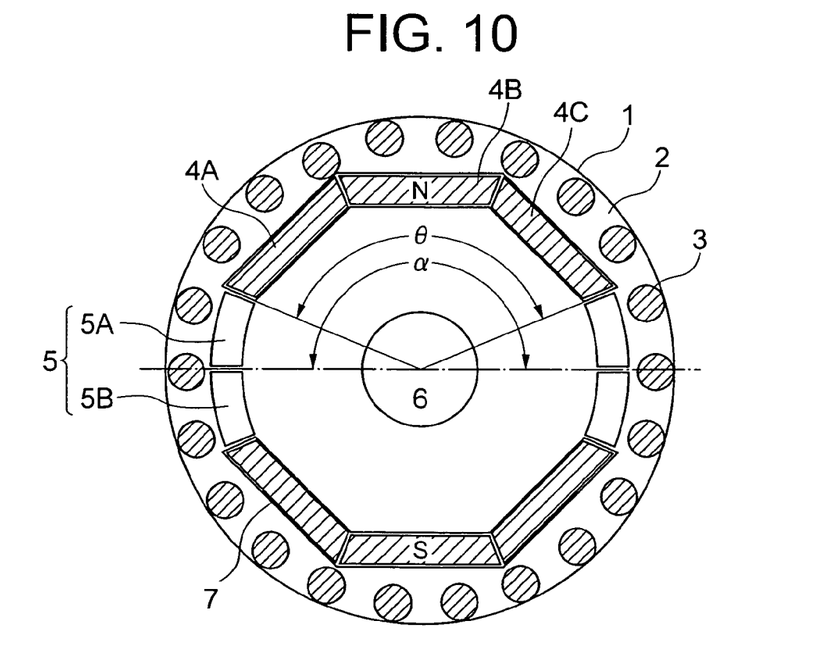
FIG. 10 is a radial sectional view of the rotor of the synchronous motor according to a eighth embodiment of the present invention.

FIG. 10 is a radial sectional view of the rotor of the synchronous motor according to an eighth embodiment of the present invention. In FIG. 10, the same components as those in FIG. 9 are given the same reference numbers and overlapping description thereof will be omitted. A difference from FIG. 9 is that the permanent magnets 4A, 4B and 4C are configured in a trapezoidal form Even if thus configured, it is possible to obtain the same characteristic as that of the embodiment shown in FIG. 7. In FIG. 10, the permanent magnet 4 is divided into three segments. However, it goes without saying that the same effect can be obtained when it is one segment or divided into two segments or even more segments.

Figure 11:
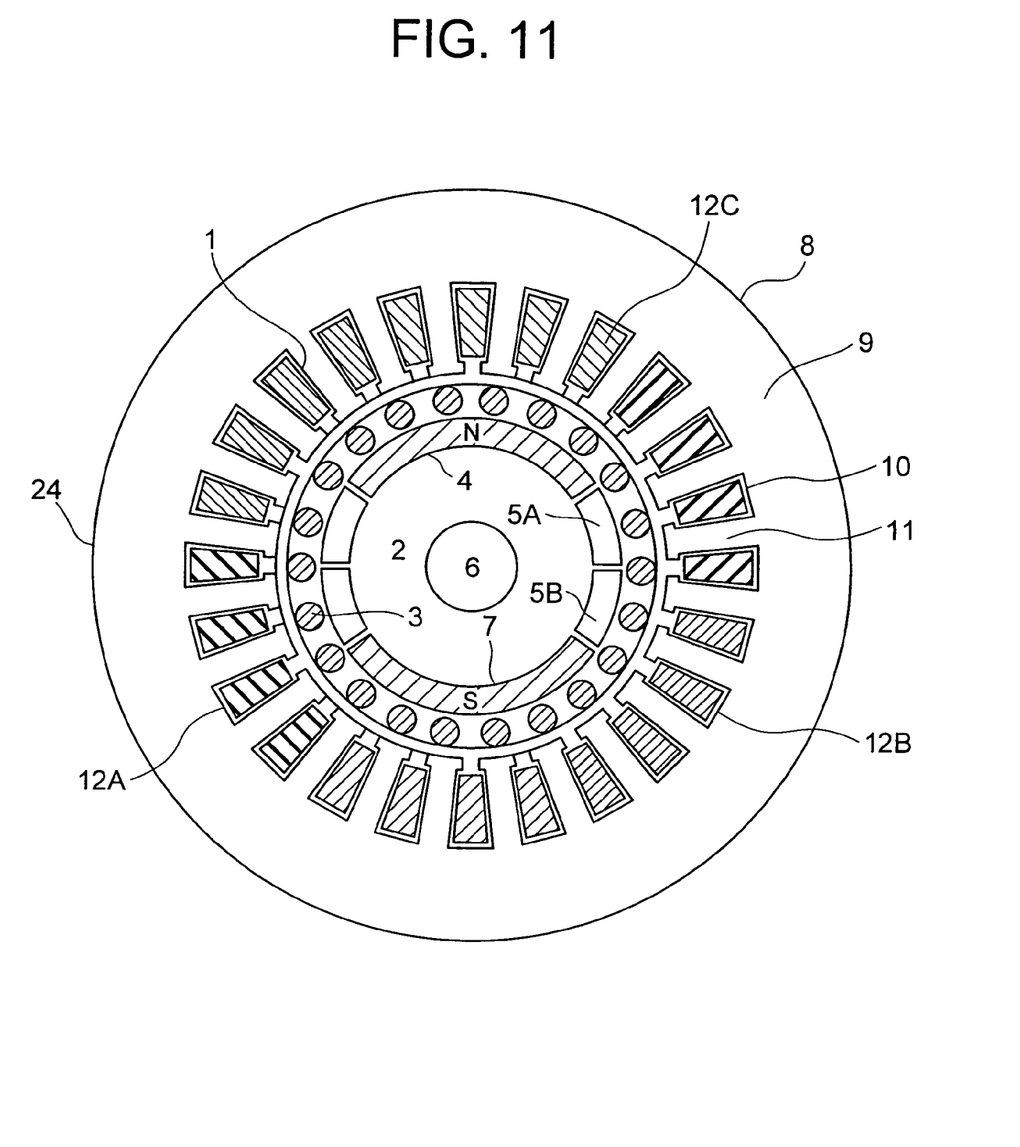
FIG. 11 is a radial sectional view of an embodiment of a permanent magnet synchronous motor according to the present invention.

FIG. 11 is a radial sectional view of the synchronous motor according to the present invention. In FIG. 11, the same components as those of the embodiments shown in FIGS. 1 to 10 are given the same reference numbers and overlapping description thereof will be omitted. FIG. 11 shows an embodiment in the case where a synchronous motor 24 is configured by combining the rotor 1 shown in FIG. 4 with a stator 8.

Here, the stator 8 includes a stator core 9, a large number (24 pieces in FIG. 11) of slots 10 provided thereon and teeth 11 divided by the slots 10. An armature winding 12 consisting of a U-phase winding 12A, V-phase winding 12B and W-phase winding 12C is wound by distributed winding in which the same phases are distributed to the large number of slots 10.

In such a configuration, if an AC voltage of a constant frequency is fed to the armature winding 12, the rotor 1 can start and accelerate as the induction motor so as to allow a constant speed drive as the synchronous motor thereafter.

Figure 12:
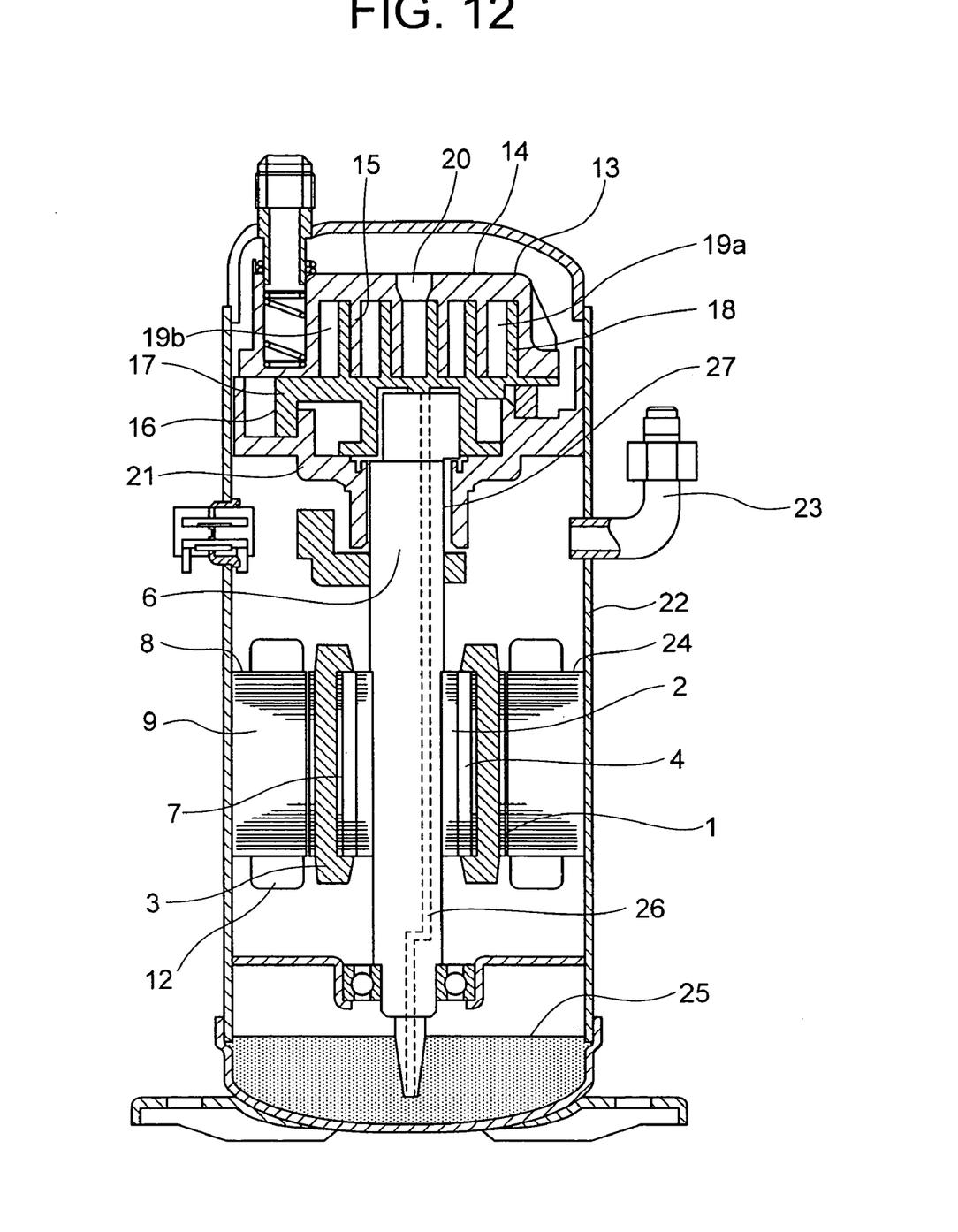
FIG. 12 is a cross section structure view of an embodiment of a compressor according to the present invention.

FIG. 12 is a cross section structure view of a compressor according to the present invention. In FIG. 12, a compression mechanism portion is formed by engaging a spiral wrap 15 erected on an end plate 14 of a fixed scroll member 13 with a spiral wrap 18 erected on an end plate 17 of an orbiting scroll member 16. The orbiting scroll member 16 is gyrated by the crankshaft 6 so as to perform a compression operation.

Of compression spaces 19 (19a, 19b and so on) formed by the fixed scroll member 13 and the orbiting scroll member 16, the compression space 19 located furthest on the outside diameter side moves toward the center of both the scroll members 13 and 16 in conjunction with orbiting movement and gradually reduces its. capacity.

When both the compression spaces 19a and 19b come close to the center of both the scroll members 13 and 16, a compressed gas in both the compression spaces 19 is discharged from a discharge port 20 communicated with the compression spaces 19. The discharged compressed gas is led inside a pressure vessel 22 in a lower part of a frame 21 through a gas passage (not shown), provided on the fixed scroll member 13 and the frame 21 to be discharged out of the compressor from a discharge pipe 23 provided on a side wall of the pressure vessel 22. The permanent magnet synchronous motor 24 composed of the stator 8 and rotor 1, as described in FIGS. 1 to 11, is included inside the pressure vessel 22 so as to rotate at a constant speed and perform the compression operation.

An oil reservoir 25 is provided below the synchronous motor 24. The oil in the oil reservoir 25 is passed through an oil passage 26 provided in the crankshaft 6 by a pressure difference generated by rotary movement to be served for lubrication of a sliding portion of the orbiting scroll member 16 and the crankshaft 6, a slide bearing 27 and the like.

Thus, it is possible to realize improvement in the efficiency of a constant-speed compressor by applying the permanent magnet synchronous motor described in FIGS. 1 to 11 as the motor for driving the compressor.

According to the embodiments above-described, it is possible to provide the permanent magnet synchronous motor with the rotor structure capable of securing necessary induced electromotive force and lowering the waveform distortion rate without increasing iron loss, the rotor thereof and the compressor using the same.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A permanent magnet synchronous motor including a rotor comprising: a large number of slots axially provided in proximity to a periphery of a rotor core, conductive bars embedded in the slots; conductive end rings for shorting the bars on axial end faces; and permanent magnets embedded in magnet insertion holes placed on inner peripheral side of the bars, wherein a ratio $\theta/\alpha$ between a circumferential pitch angle $\theta$ of the permanent magnets and a magnet pole pitch angle $\alpha$ of the permanent magnets is in a range of greater than 0.67 to no greater than 0.91, and wherein the rotor comprises only two magnetic poles.

2. A permanent magnet synchronous motor according to claim 1, wherein the magnet insertion holes are substantially arc in shape, and the permanent magnets are substantially arc in shape.

3. A permanent magnet synchronous motor according to claim 2, wherein an outside diameter of the permanent magnet is formed to be non-concentric to an outside diameter of the magnet insertion hole.

4. A permanent magnet synchronous motor according to claim 1, wherein there are at least one substantial arcuate magnet insertion holes per magnetic pole while there are at least one substantial arcuate permanent magnets per magnetic pole.

5. A permanent magnet synchronous motor according to claim 1, wherein a magnetic orientation of the permanent magnets is a radial orientation.

6. A permanent magnet synchronous motor according to claim 1, wherein there are at least one tabular magnet insertion holes per magnetic pole while there are at least one tabular permanent magnets per magnetic pole.

7. A permanent magnet synchronous motor according to claim 1, wherein there are at least one substantial trapezoidal permanent magnets per magnetic pole.

8. A permanent magnet synchronous motor according to claim 1, wherein a magnetic orientation of the permanent magnets is a parallel orientation.

9. A permanent magnet synchronous motor according to claim 1, wherein a material of the permanent magnets is a rare-earth magnet.

10. A permanent magnet synchronous motor according to claim 1, wherein at least one hole is provided between adjacent magnetic poles of the rotor.

11. A permanent magnet synchronous motor according to claim 1, comprising a stator including a stator winding wound by distributed winding in six or more slots.

12. A compressor comprising:
a compression mechanism portion for suctioning, compressing and discharging a refrigerant; and
a driving motor for driving the compression mechanism portion,
wherein the driving motor comprises the permanent magnet synchronous motor according to claim 1.

13. A permanent magnet synchronous motor according to claim 1, wherein the motor rotates at a constant speed and performs a compression operation.

14. A permanent magnet synchronous motor according to claim 1, wherein θ is the circumferential pitch angle subtended by both outermost-circumferential-side outer end surfaces of the permanent magnet.

15. A permanent magnet synchronous motor according to claim 1, wherein the ratio is in the range of greater than 0.67 to less than 0.91.

16. A permanent magnet synchronous motor according to claim 1, wherein the ratio is about 0.72.

17. A permanent magnet synchronous motor including a rotor comprising: a large number of slots axially provided in proximity to a periphery of a rotor core, conductive bars embedded in the slots; conductive end rings for shorting the bars on axial end faces; and permanent magnets embedded in an inner peripheral side of the bars; wherein a ratio θ/α between a circumferential pitch angle θ of the permanent magnets and a magnet pole pitch angle α of the permanent magnets is in a range of greater than 0.61 to no greater than 0.91; and wherein the rotor comprises only two magnetic poles.

18. A permanent magnet synchronous motor according to claim 17, wherein the ratio is in the range of greater than 0.67 less than 0.91.

19. A rotor of a permanent magnet synchronous motor comprising: a large number of slots axially provided in proximity to a periphery of a rotor core, conductive bars embedded in the slots; conductive end rings for shorting the bars on axial end faces; and permanent magnets embedded in an inner peripheral side of the bars; wherein a ratio θ/α between a circumferential pitch angle θ of the permanent magnets and a magnet pole pitch angle α of the permanent magnets is in a range of greater than 0.67 to no greater than 0.91; and wherein the rotor comprises only two magnetic poles.

20. A permanent magnet synchronous motor according to claim 19, wherein the ratio is in the range of greater than 0.67 to less than 0.91.

* * * * *